United States Patent [19]
Piazzi

[11] Patent Number: 5,265,695
[45] Date of Patent: Nov. 30, 1993

[54] PORTABLE COLLAPSIBLE MOTORIZED GOLF CART

[76] Inventor: Roberto Piazzi, 3, Via Garibaldi, 44011 Argenta (Ferrara), Italy

[21] Appl. No.: 949,724

[22] Filed: Sep. 23, 1992

[30] Foreign Application Priority Data

May 18, 1992 [EP] European Pat. Off. ............ 92830231

[51] Int. Cl.$^5$ ...................... B62K 15/00; B62D 61/02
[52] U.S. Cl. .................................. 180/208; 180/220; 280/DIG. 5
[58] Field of Search .................. 180/208, 220, 65.1; 280/DIG. 5

[56] References Cited

U.S. PATENT DOCUMENTS

| | | | |
|---|---|---|---|
| 2,111,691 | 3/1938 | Salsbury | 180/208 X |
| 2,771,145 | 11/1956 | Peters | 180/208 |
| 3,354,975 | 11/1967 | Stuart | 180/208 |
| 3,369,629 | 2/1968 | Weiss | 180/208 |
| 3,572,757 | 3/1971 | Camps | 180/208 |
| 3,580,349 | 5/1971 | Brennan et al. | 180/208 |
| 3,605,929 | 9/1971 | Rolland | 180/208 |
| 4,821,832 | 4/1989 | Patmont | 180/208 |
| 4,830,133 | 5/1989 | Gaddi | 180/208 |

*Primary Examiner*—Brian Johnson
*Attorney, Agent, or Firm*—McAulay Fisher Nissen Goldberg & Kiel

[57] ABSTRACT

A portable collapsible golf cart vehicle adapted for use on a golf fairway and collapsible for storage and transport. A scooter-type vehicle having a steering mechanism and rear propelling mechanism in which the steering mechanism includes a steering column coupled with a steering handle for rotation of the steering column. A pivotal connection is provided for pivotally connecting and locking the steering mechanism in one position during propelling of the vehicle and in another position for storage of the vehicle. The mechanism includes a pivotal unit and a rear wheel with the pivotal unit being in a first position for use in a scooter vehicle and in a second position for storage in the compact condition.

18 Claims, 2 Drawing Sheets

PORTABLE COLLAPSIBLE MOTORIZED GOLF CART

BACKGROUND OF THE INVENTION

1. Field of the Invention

This invention is concerned with a portable collapsible motorized golf cart.

More particularly, the invention is concerned with a scooter-type of motorized vehicle or a two-wheeled motorized vehicle for movement on golf links for use as a golf cart and is equipped to carry a golf bag with golf clubs, clothing and other paraphernalia which a golfer considers necessary. The motorized vehicle is collapsible to reduce it in size and volume to facilitate storage thereof during non-use and, in particular, to permit transport thereof in the trunk or luggage compartment of a motor vehicle.

1. Description of the Prior Art

Current vehicles presently used by a golf player are a three or four-wheeled self-moving vehicle which permits the movement from one position to another and onto which the golf bag and clubs can be placed and carried. Also, there is provided a club-holder which can be manually dragged along the fairway. The first of the aforesaid vehicles is suitable to perform what is intended, but it is too big and costly for use both on the fairway and to store and transport in a motor vehicle or automobile and, in any case, the prior art vehicle would require a carrier or trailer to move it from one set of golf links to another.

Since players do move from one golf course to another, and some desire to take the cart home with themselves, it is necessary to provide an easily transportable item.

SUMMARY OF THE INVENTION

The invention provides for a simplified transport motor vehicle using a scooter frame provided with only two wheels, and a separate, accompanying housing for the golf bag and clubs. This results in a lower cost and ease of manufacture, as well as reduction in the vehicle weight and dimension and, during non-use, provides for a movement of its parts into a compact form to enable storage as well as a reduction in size of the frame compartment, to place the motor vehicle into the storage area or trunk of a passenger automobile-type motor vehicle.

A feature of the invention generally includes its particular linear frame on which the player can ride and carry the required golf clubs and other necessary materials, and the scooter-type vehicle provides for the proper support of the player. In order to propel the vehicle, the player grasps the handle-bar and removes a vehicle stabilization device which is activated when stopping the vehicle and brings one foot which is on one side of the scooter on the support base thereof, and the user places himself with the posterior part of his body against the support part or seat while holding the vehicle in a slightly slanting position by means of the other foot on the ground to determine a balancing condition. The player then starts to drive by gripping the handle-bar to accelerate a drive motor and brings the foot which is still on the ground onto the other support base which is on the other side of the scooter frame for determining and providing a balanced disposition and, consequently, the advancement of the scooter-type vehicle. At the end, to stop this movement, the player or user brings, in the following sequence, the placement of his two feet onto the ground and the scooter-type vehicle is placed into a stopped position.

The scooter-type vehicle generally includes a frame made from three basic parts which move into overlapping relationship relative to each other for achieving a reduction in size.

To these ends, the present invention consists in the provision of a motorized golf cart in the form of a scooter-type vehicle having a pair of wheels, one of which is a rear wheel and the other of which is a front wheel, and one of the wheels is a steering wheel for steering the scooter-type vehicle with the wheels aligned along the longitudinal axis of the vehicle in the direction of travel, and includes a frame having three basic parts; one of the parts being a linear scooter having an upper pair of parallel support bases for the feet of the user, a front part bearing on a pin joint provided on the steering column to permit movement of the steering column from a normal conventional use position to a storage position and a lower down portion integral with the wheel hub for a front wheel and an upper part provided with a telescoping steering column with a handle-bar. A posterior part includes a motorized unit for rotating the other or rear wheel. An area proximate to the seat or support part is provided for carrying a kit container and a golf bag container for the clubs, and a support for the player. The support and player support are used to support the rear portion of the scooter vehicle in its folded and stored condition.

DESCRIPTION OF THE PREFERRED EMBODIMENT

Figure 1:
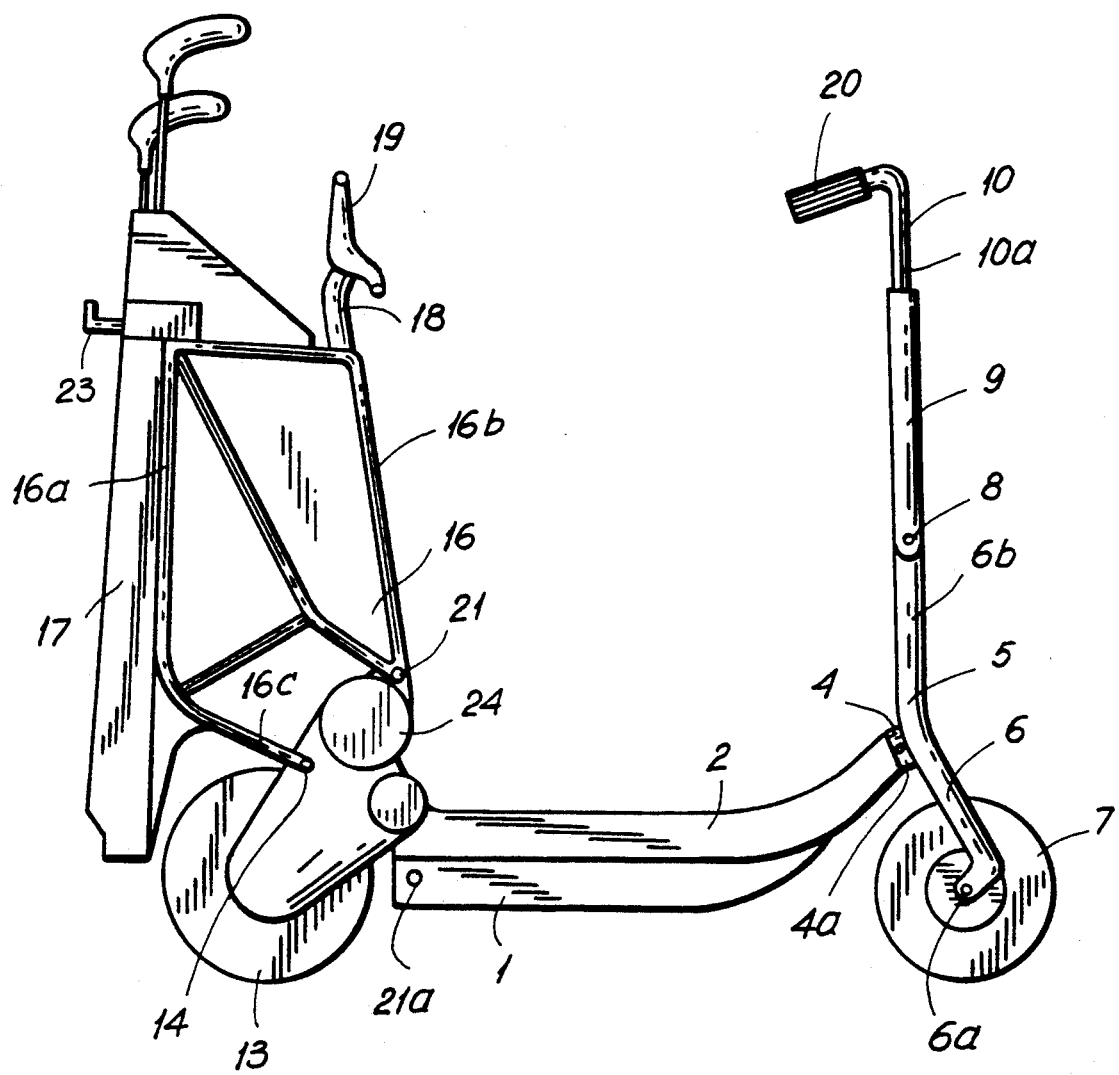
FIG. 1 is a side view of a scooter-type vehicle ready for use with golf clubs shown in their position in a golf club container.

Referring now more particularly to the drawings, linear scooter 1 generally includes a pair of parallelly arranged, oppositely disposed support bases 2, 3 (see FIG. 3), one on the left side of the scooter and the other on the right side, for placement of a user's left and right foot thereon, respectively. Coupled with each of the parallel bases 2, 3 is a coupling member 4a having a pin joint 4 providing an axle connected with a steering column 5 rotatable about the axle (not seen) within the pin joint 4 to provide a steering mechanism for the scooter 1. The coupling 4a provides for a steering post holder mechanism to permit rotation of the steering column or steering member 5.

Steering column 5 is angulated and includes, a lower end thereof below the pin joint 4, a hub member 6 having an axle portion 6a to which a front free wheeling wheel 7 is rotatable about the axle portion 6a journalled within hub member 6; and at an upper end of steering column 5, above pin joint 4, there is provided a telescopic arrangement including an outer column 9 which is pivotally connected at a pivotal connection and locking joint 8 with a lower portion 6b extending from hub member 6 and a steering control including a handle-bar unit 10. The handle-bar unit 10 is a conventionally arranged U-shaped member 10a (see FIG. 3) having a post 10b which extends substantially orthogonally into column 9 in a telescopic arrangement so that handle-bar 10 can be raised or lowered relative to outer column 9 of steering member 5.

At the rear of the scooter 1, there is a rear end unit 11 which includes a hub unit 11a to provide for journalling of a rear end shaft 12 to which a rear wheel 13 is held thereon for rotation axially about the shaft 12. Unit 11 and steering column 5 are axially arranged along a central axis of the scooter 1.

Figure 3:
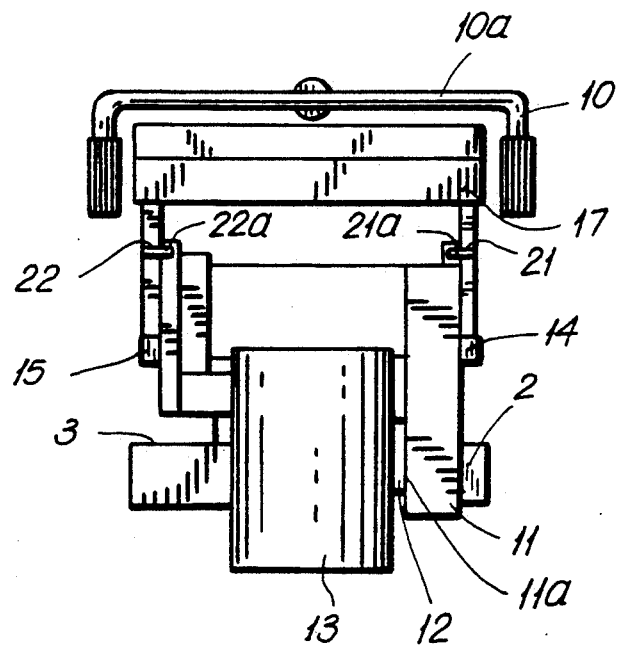
FIG. 3 is a rear view of the vehicle of FIG. 1, and as shown in FIG. 2, already in a compact condition.

Pivotally connected with rear end unit 11 is a kit container 16 and a golf club container 17 for holding and transporting the golf clubs. Kit container 16 and golf club container 17 are pivotally connected by virtue of pivot joints 14 and 15 (see FIG. 3) on opposite sides of rear end unit 11 to facilitate rotation of kit container 16 and golf club container 17 from a vertical position (in use position) as shown in FIG. 1 to a substantially horizontal position (a storage position) as shown in FIG. 3.

Locking pins 21, 22 (see FIG. 3) are provided to lock kit container 16 and golf club container 17 in the upright (in use) position as well as to permit them to be rotated about rotation joints 14, 15 to another locking position (the storage position) for a condition for storage. Coupled with kit container 16 is a support 18 on which is provided a seat support part 19; the support 18 is used as a support for the seat support part 19, and seat support part 19 and support 18 are integral with each other for supporting the user or golf player during driving of the scooter as well as for support of the kit container 16 and golf bag container 17 in the folded or compacted condition thereof.

Unit 11 can preferably contain a battery operated unit or a motor unit which is operable by means of an acceleration grip 20 on handle-bar unit 10 in much the same way as a conventional motor-cycle unit; the wiring interconnections are omitted for the sake of simplicity of showing.

Figure 2:
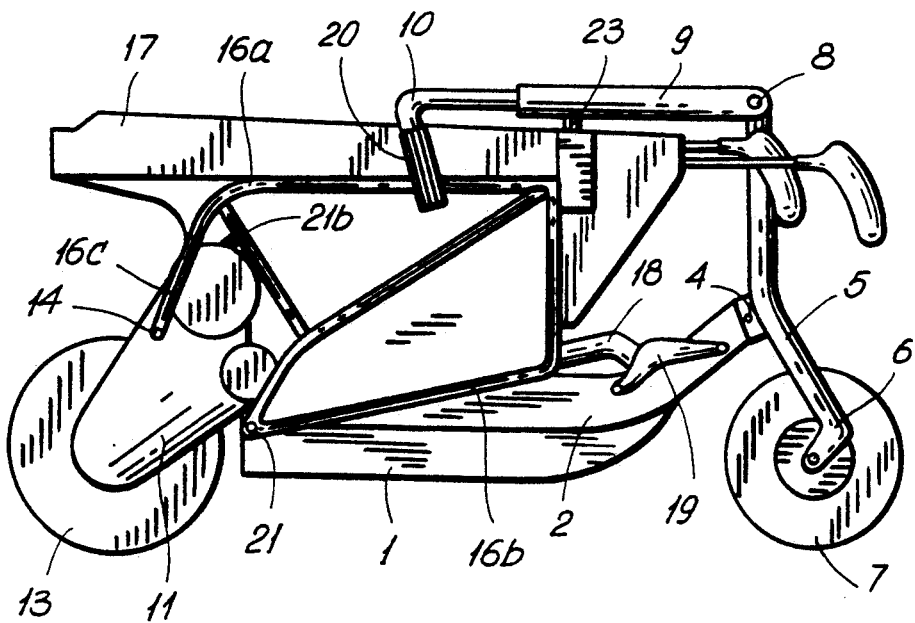
FIG. 2 is a rear side view of the vehicle of FIG. 1 in a compact or reduced size condition.

Golf container 17 includes a rest 23 for the handle-bar 10 in the closed condition, as best seen in FIG. 2. Rest 23 can also be used as a hook to hang items. Kit container 16 can be used to store various items which a golfer may consider necessary to carry.

Kit container 16 includes arms 16a and 16b. One end 16c of arm 16a is rotatably connected to rotation joint 14 (see FIGS. 1 and 3) and one end of arm 16b is locked by means of locking pins 21 and 22, respectively. Locking pins 21 and 22 are unscrewed from their position in FIG. 1 and locked into locking pin receivers 21a and 22a, respectively. Locking pin 21 and receiver 21a are shown in FIG. 1, and the rear of the side view in FIG. 1 which is not shown also includes locking pin 22 and receiver 22a which are shown in FIG. 3. The locking pins 21 and 22 are unscrewed from their first locking position in the upright condition of kit container 16 and golf container 17 in FIG. 1 and then screwed into receivers 21a and 22a (FIG. 3) into their second locking position in FIGS. 2 and 3. As best seen in FIG. 2, receiver 21b for receiving the locking screw pin 21 is shown for receiving thereof when the kit 16 is in the upright position as shown in FIG. 1.

In order to drive scooter 1, the user or player at first brings one foot onto one of the relative parallel support bases 2, 3 of the scooter and, with the other foot still on the ground, starts the rotation of the motor by means of the acceleration grip 20. Then, the user also brings the other foot onto other previously unused the support base. To stop the scooter-type motor vehicle, grip 20 is again moved towards its starting position to reduce the speed and, by means of an auto-brake or other conventional means (not shown), the scooter vehicle movement may also be rapidly stopped and the vehicle is held in slanting position towards the ground by means of a conventional support (not shown) or by the user.

For size reduction when storage is desired which permits the loading of the scooter onto a motor car, locking screw pins 21 and 22, schematically shown, (see FIG. 3) are unscrewed and the unit 11 which includes kit container 16, golf club container 17, seat support 18 and support part 19 are rotated about rotation joints 14, 15 relative to parallel support bases 2, 3 from a usage position to a storage position as shown in FIG. 2 and then locked in place in the FIG. 2 condition by means of locking screw pins 21 and 22. By means of a fitting knob (not shown) or other conventional means, joint 8 is unscrewed and is brought from the FIG. 1 usage position into the FIG. 3 storage position with outer column 5 onto the container 17, the telescopic steering column 9 carrying the handle-bar 10 also is moved to place it and the scooter into its compact condition.

In a preferred embodiment, the scooter is provided with a battery and motor 24 for electric operation.

While there has been shown and disclosed what is considered to be the preferred embodiments of the invention, various changes and modifications may be made without departing from the scope of the invention.

I claim:

1. A portable collapsible golf cart vehicle adapted for use on a golf fairway and collapsible for storage and transport, comprising:

said vehicle including a frame having a single front wheel, and a single rear wheel coupled to said frame and a steering mechanism coupled with said single front wheel for steering thereof, and a rear propelling mechanism coupled with said rear wheel for propelling said golf cart vehicle, said single front wheel and said single rear wheel being axially arranged along a central axis;

said steering mechanism including a steering member having an outer steering column coupled with a steering post to permit rotation of said steering column relative to said central axis and pivotal connection means for pivotally connecting and locking said steering column in one position for use in propelling and driving said vehicle and in another position for storage of said vehicle;

said rear propelling mechanism including a pivotal unit and rear wheel means, additional pivotal connection means for pivotally connecting said pivotal unit to said frame, said pivotal unit being pivotable about said frame from a first position for use as said golf cart vehicle and to a second position for storage in a compact condition; and said rear wheel means including means for coupling said rear wheel thereto in axial arrangement along said central axis; and oppositely disposed fixed horizontal support bases fixed to said frame on each side thereof and of the central axis of said vehicle, each for supporting one foot of a driver of said device, said rear wheel pivotal unit including locking pins for locking said pivotal unit in said first and second positions; first receiver means for receiving said locking pins when said rear wheel pivotal unit is in said first position and second receiver means for locking said locking pins when said rear wheel pivotal unit is in said second position.

2. The vehicle according to claim 1, wherein said steering column includes a telescopic outer column and a steering control unit including a single handle-bar, and a steering post telescopically receivable in said outer column and a hub mechanism at an end of said steering column for coupling said front wheel to said outer column.

3. The vehicle according to claim 1, wherein said pivotal connection means includes a rotation and locking joint for permitting said steering mechanism to be locked in a vertical position for locomotion of said vehicle and rotatble into a horizontal position for storage.

4. The vehicle according to claim 2, wherein said steering column includes a pin joint for connecting said steering mechanism with said oppositely disposed fixed horizontal support bases, a first member connected with said front wheel, and a second member forming said outer column, and said pivotal connection means including a locking joint for locking said first and second members together to form a substantially uniform continuous steering member coaxial with each other and to permit said telescopic member to be pivoted out of coaxial relationship for storage and to form a compact unit.

5. The vehicle according to claim 1, wherein said pivotal unit is pivotally connected with said frame and includes a golf club carrier and seat means, said golf club carrier and said seat means being pivotal as a unit and said seat means including a support for said pivotal unit in the compact condition.

6. The vehicle according to claim 1, wherein said steering mechanism includes locking means for locking said steering mechanism in said one and said other positions.

7. The vehicle according to claim 1, wherein said oppositely disposed fixed horizontal support bases are parallel with each other and said pivotal unit includes a golf club carrier and seat means, said seat means including a seat support and a support seat supported by said seat support, said support seat having a back portion for engagement with said upper support connected with said parallel bases in a closed storage condition of said vehicle for supporting said golf club carrier in the compact condition.

8. The vehicle according to claim 7, wherein said pivotal connection means includes a joint for permitting said steering mechanism to be locked in a vertical position for movement as a golf club transporter and a horizontal position for storage.

9. The vehicle according to claim 8, wherein said golf club carrier includes a separate rest mounted thereto for supporting said handle-bar in the closed compact condition and for maintaining said handle-bar when in the folded compact condition out of direct contact with said golf club carrier.

10. The vehicle according to claim 9, wherein said pivotal unit is first pivoted over onto said frame and then said front handle-bar is folded over onto said pivotal unit, and said pivotal unit include a handle-bar rest for supporting said handle-bar in said compact condition.

11. The vehicle according to claim 10, wherein said handle-bar rest is connected with said golf club container and includes a hook portion.

12. The vehicle according to claim 1, wherein said rear wheel means includes said rear wheel, a hub and said rear wheel being a free-wheeling rear wheel connected to said hub.

13. The vehicle according to claim 1, wherein said rear wheel means includes a battery operated motor, means coupling said motor to said rear wheel for imparting rotational movement, and means on said handle-bar coupled with said motor for accelerating and decelerating said motor.

14. The vehicle according to claim 13, wherein said pivotal unit includes a golf club container and a kit which are pivoted as a unit, said golf club container being adapted to contain golf clubs when said golf club container is pivoted into the compact condition.

15. The vehicle according to claim 14, wherein said pivotal connection means includes a joint for permitting said steering mechanism to be locked in a vertical position for transport and a horizontal position for storage.

16. The vehicle according to claim 15, wherein said golf club container includes a rest for said handle-bar in the closed compact condition, said rest projecting from said golf club container in a vertical position thereof.

17. The vehicle according to claim 16, wherein said pivotal unit is first folded and then said front handle-bar is folded over said pivotal unit, and said pivotal unit includes a handle-bar rest for said handle-bar to maintain said handle-bar out of contact with said golf club container.

18. The vehicle according to claim 17, wherein said handle-bar rest is connected with said golf club container.

* * * * *